May 31, 1932. R. B. WILLIAMSON 1,860,489
INDUCTION SYNCHRONOUS MOTOR SYSTEM
Filed April 30, 1928
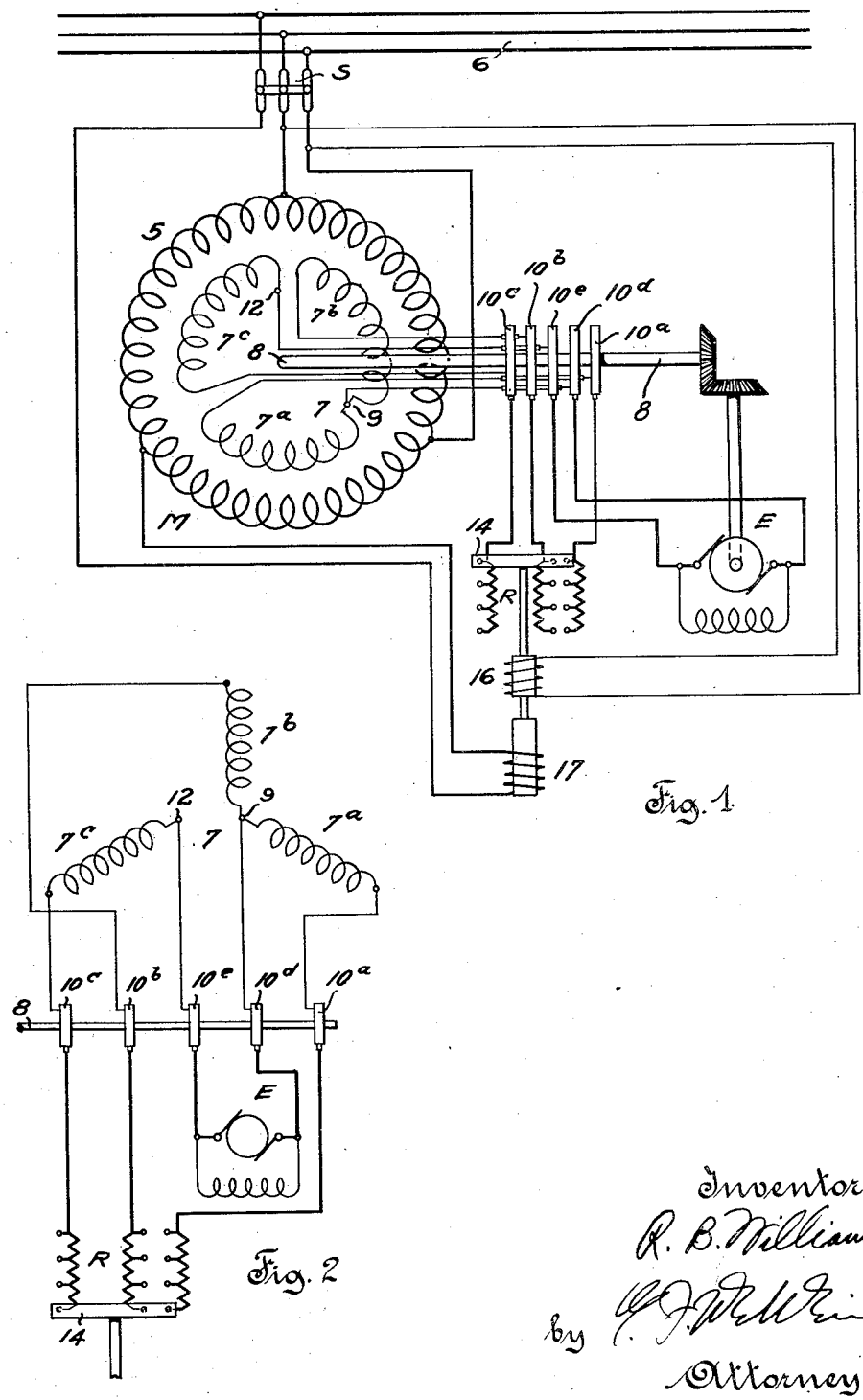
Inventor
R. B. Williamson
by
Attorney Patented May 31, 1932

1,860,489

UNITED STATES PATENT OFFICE

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

INDUCTION-SYNCHRONOUS MOTOR SYSTEM

Application filed April 30, 1928. Serial No. 273,797.

This invention relates in general to alternating current dynamo electric machines, and it is more particularly concerned with such machines as are capable of being started with operating characteristics of an asynchronous or induction motor and of operating under normal conditions with characteristics of a synchronous motor.

Alternating current motors have heretofore been provided wherein the secondary element, usually the rotor, has been provided with a multi-phase winding distributed in peripheral slots of the core, terminals of such winding being brought to collector rings to provide for the insertion of a variable resistance in the circuit of the secondary winding, and, when the motor is up to speed, to provide for short-circuiting the resistance and connecting a direct current exciter in the circuit of the distributed winding on the secondary element, to thereby cause the motor to be pulled into and maintained at synchronous operating speed.

The present invention is concerned with a polyphase motor of the induction-synchronous type arranged for starting as an induction motor and for normal operation as a synchronous motor and wherein the number of connections to the winding and the number of collector rings for insuring the desired connection of the winding in circuit with a variable resistance and a direct current exciter under starting and running conditions are reduced to a minimum, and wherein the entire arrangement is of such a character as to provide for great simplicity and, at the same time, to insure highly desirable starting and normal running characteristics of the machine. As a factor which contributes to a considerable degree to the utility and simplicity of the present invention, the direct current exciter may be permanently connected in circuit with the secondary windings of the motor at a point which insures that the exciter is not subjected to unduly high potential to ground during the operation of the machine as an induction motor, particularly during the starting period of the motor.

It is an object of the present invention to provide a system including a polyphase alternating current motor of improved design and construction wherein the motor is adapted to be started as an induction motor and operated normally as a synchronous motor, and wherein the source of direct current excitation used during normal operation of the motor at synchronous speed may remain in circuit, without harmful effects, during operation of the motor both as an induction motor during the starting period and as a synchronous motor during normal running.

It is a further object of the present invention to provide an improved system of the character set forth hereinabove wherein the direct current exciter is permanently connected to the several phases of a polyphase alternating current winding at the neutral point of such winding.

It is a further object of this invention to provide an improved system of the character set forth hereinabove wherein the winding used as the secondary of an induction motor and the direct current field of a synchronous motor is of the three-phase Y-connected type, and the source of direct current excitation is connected in series with one of the phase windings between the latter and the neutral point of such winding.

These and other objects and advantages are attained by the present invention, various novel features of which will be apparent from the description and drawings herein, disclosing an embodiment of the invention, and will be more particularly pointed out in the claims.

In the drawings:

Fig. 1 is a diagrammatic showing of an alternating current motor system embodying features of the present invention.

Fig. 2 is a simplified diagrammatic showing of the circuits associated with the secondary element of the motor of Fig. 1.

In accordance with the disclosure of Figs. 1 and 2, the primary element of an alternating current motor M, this element being considered as the stator, is provided with three-phase energizing winding 5, the same being of the distributed type and supplied from an alternating current distribution line 6, through a controlling switch S. The secondary element of the motor, considered as the rotor, is provided with three-phase energizing winding 7 distributed in peripheral slots of the core, the several phases of this winding being designated 7a, 7b and 7c, and is mounted on the shaft 8.

As indicated, the inner terminals of the sections or phases 7a and 7b of the secondary winding are connected to a common or neutral point 9. The outer terminals of the phase windings 7a, 7b and 7c are connected to collector rings, 10a, 10b and 10c, respectively, on the rotor shaft; and where, as indicated herein, it is intended that the exciter for furnishing direct current energy to the secondary winding 7 during operation of the motor at synchronous speed, is not to be directly connected to the shaft of the motor, the neutral point 9 of the secondary winding may be connected to a collector ring 10d; and the outer terminals of these winding sections 7a and 7b may be connected to collector rings 10a and 10b, respectively. The outer terminal of the winding section 7c may be connected to a collector ring 10c; and the inner terminal of this winding section 7c, indicated at 12, may be connected to a collector ring 10e. Brushes contacting with collector rings 10a, 10b and 10c are connected to terminals of sections of a three-phase variable resistance R, a movable short-circuiting device 14 being provided for contacting with suitable points on these resistances to short-circuit all of any desired portion of the resistance, particularly during the starting operation of the motor as an induction motor.

A direct current exciter E, here indicated as being of the shunt type, and being provided with suitable field regulating means of conventional type, is connected to brushes contacting with collector rings 10d and 10e, the effect of this connection being to insert the exciter in series with the winding section 7c, between the inner terminal 12 thereof and the common connection 9 of the winding sections 7a and 7b. In this manner, the exciter, during normal synchronous operation of the motor, supplies direct current to the several winding sections, the winding section 7c being in series with the two winding sections 7a and 7b connected in parallel. Under ordinary conditions of synchronous operation of the machine, the variable resistance R is in substantially short-circuited condition.

Any suitable arrangement may be provided for actuating the movable short-circuiting element 14 and thus controlling the effective value of the variable resistance R in the secondary circuit of the motor M, a satisfactory arrangement including one which automatically varies the speed of the motor as the load thereon varies, such an arrangement securing automatic cutting out of the resistance during the starting operation, while preventing excessive current in the circuit of the motor and insuring a proper degree of acceleration thereof. The type of regulating device shown includes an electromagnetic actuating device comprising a core and its winding 16 supplied from the motor supply line, preferably at a point between the switch S and the primary winding of the motor, so as to be rendered active when the switch S is closed, this winding tending to operate the regulating element 14 in a direction to cut out resistance, and a second core and its winding 17 in series with the primary circuit of the motor M, the latter element of the regulator exerting an effect on the element 14 opposite to that of the electromagnet 16. The movable element of the regulator is biased by gravity, as indicated, or other suitable means, to the position wherein maximum resistance is included in the secondary circuit, as indicated in Fig. 2.

The exciter E may preferably be driven from the main motor M through a mechanical drive, indicated conventionally in Fig. 1, which insures operation of the exciter at a suitably high normal operating speed. Through this arrangement, the speed of operation of the exciter always bears a definite relation to the speed of operation of the main motor. However, where it is possible to use a direct-connected exciter or one having its windings carried by the core of the secondary element of the motor, use of slip rings 10d and 10e may be avoided.

Assuming that the motor M is inoperative and it is desired to start the same. The switch S is closed and energy is supplied to the primary winding 5 either directly from the supply line 6 or through potential reducing starting transformers, until the speed of the motor has been brought up to a value approaching synchronous speed, at which time the winding 5 is connected directly to the alternating current supply line 6. With the resistance R fully included in circuit at starting, as indicated in Fig. 2, the currents induced in the circuit of the secondary winding 7 and the exciter E are held to a reasonable and safe value, for the electromagnet 16 is effective to actuate the movable element 14 of the regulator only as fast as the series winding of the electromagnet 17 will permit, the speed of operation being predetermined so as to provide for a safe current in the secondary circuit of the motor. As the motor comes up to speed, increments of the variable resistance R are thus short-circuited by the operating arm 14 until, as the speed approaches fairly close to synchronous speed of the motor, substantially all of the variable resistance R is short-circuited.

As the speed of the motor approaches synchronous speed, the voltage generated at the terminals of the exciter E whose speed has increased with the speed of the main motor, becomes sufficiently high so that but little induced voltage, due to the effects of the primary winding, is necessary in order to supply the required energizing current in the secondary winding 7; and the motor consequently more closely approaches and automatically reaches synchronous speed, at which time the secondary winding 7 is energized wholly by direct current supplied by the exciter, the current at this time passing from the positive terminal of the exciter, through the collector ring 10e, the winding section 7c, collector ring 10c, to the short-circuiting element 14 of the variable resistance R, whence it divides, passing in parallel to collector ring 10b and winding section 7b and through collector ring 10a and winding section 7a, to the neutral connection 9 of the winding sections, and thence through the collector ring 10d, to the negative terminal of the exciter.

The motor continues to operate as a synchronous motor with its direct current field suitably and wholly energized by the exciter E until some disturbing condition, such as an excessive overload, occurs. In case the motor should get out of step due to any such excessive overload, the only effect is that the speed of the motor drops to a point where the slip, supplementing the voltage of the exciter E, is sufficient to furnish or cause the required excitation of the secondary element to carry the overload present. And the effect of this excessive overload, reflected through the winding of the electromagnet 17, may be such as to cause the insertion of an increment of resistance R in the secondary circuit of the motor, thus assisting in the development of sufficient voltage and power to carry the overload. As the excessive overload or other disturbing factor disappears, the speed of the motor increases, and the motor again automatically synchronizes itself and continues to operate at its normal or synchronous speed.

It will be apparent that, through the system and apparatus described hereinabove wherein the direct current exciter is normally connected in circuit, the synchronous motor is readily controlled through as simple a form of apparatus as is ordinarily used on a wound rotor induction motor, and, with the exciter connected in circuit at the neutral point of the distributed phase windings, the required starting torque may be developed during operation of the motor as an induction motor utilizing all three phases of the secondary winding closed on itself through the exciter, without subjecting the exciter windings to any unduly high potential during such starting operation.

It should be understood that the invention claimed is not limited to the particular details of construction and arrangement shown and described herein, for various modifications within the scope of the claims will be apparent to persons skilled in the art.

It is claimed and desired to secure by Letters Patent:

1. In combination, a dynamo-electric machine adapted for operation as both an alternating current induction motor and a synchronous motor, said motor having its secondary or exciting element provided with a distributed winding of the three-phase type having its phase winding sections connected in Y to provide a point which is neutral with respect to voltage induced in said winding sections during operation of said machine as an induction motor, a direct current exciter supplied with mechanical energy by said machine and electrically connected between the inner terminal of one of said phase winding sections and said neutral point, and a variable resistance connectible to the outer terminals of the several phase winding sections.

2. In combination, a dynamo-electric machine adapted for operation as both an alternating current induction motor and a synchronous motor, said motor having its secondary or exciting element provided with a distributed winding of the three-phase Y-connected type, a direct current exciter mechanically driven by said machine and electrically permanently connected between the inner terminal of one of said phase winding sections and a common connection point of said phase windings which is neutral with respect to voltage induced in said winding sections during operation of said machine as an induction motor, and a variable resistance device connected to the outer terminals of the several phase winding sections and in the normal circuit through said exciter.

3. In combination, an alternating current machine adapted for operation as both an induction motor and synchronous motor and having its secondary or exciting element provided with a distributed winding including three angularly displaced phase winding sections, a direct current exciter connected in circuit to terminals of a plurality of the winding sections of said secondary element at a point thereof which is neutral with respect to voltage induced in said winding during operation of said machine as an induction motor, a resistance device, and means for connecting said resistance device in circuit to the opposite terminals of said winding sections during operation of said machine as an induction motor.

4. In combination, a dynamo-electric machine adapted for operation as both an alternating current induction motor and synchronous motor and having its secondary or exciting element provided with a polyphase winding having the phase winding sections thereof connected to a neutral point, a direct current exciter, a resistance device, and means for connecting said exciter in circuit with a plurality of phases of said secondary winding with the latter in series with each other and with said exciter at the neutral point thereof during the starting of said motor as an induction motor and during normal operation of said motor as a synchronous motor, and for connecting said resistance device in circuit with said phase windings and to terminals thereof opposite to those connected at said neutral point during starting of said motor.

5. In combination, a dynamo-electric machine adapted for operation as both an alternating current induction motor and synchronous motor, said machine having its secondary or exciting element provided with a distributed winding of the polyphase type, having at least three angularly displaced phase winding sections having a common connection point which is neutral with respect to voltage induced in said winding sections during operation of said machine as an induction motor, a direct current exciter connected in circuit with said secondary winding between those terminals of a plurality of said phase winding sections at said common connection point thereof, a resistance device, and means for connecting said resistance device in circuit with the opposite terminals of a plurality of said phase winding sections during induction motor operation of said machine.

6. In combination, a dynamo-electric machine adapted for operation as both an alternating current induction motor and synchronous motor, said machine having its secondary or exciting element provided with a distributed winding of the polyphase type, having at least three angularly displaced phase winding sections, terminals of two of said phase windings being connected at a point which is neutral with respect to voltage induced in said winding sections during operation of said machine as an induction motor, a direct current exciter connected in circuit between a third phase winding and said neutral point of said first two sections, a resistance device, and means for closing the circuit of said phase winding sections through said resistance device during starting of said motor as an induction motor.

7. In combination, a dynamo-electric machine adapted for operation as both an alternating current induction motor and a synchronous motor, said machine having its secondary or exciting element provided with a distributed winding of the three-phase type, the sections of said winding being connected in Y at a point which is neutral with respect to voltage induced in said winding sections during operation of said machine as an induction motor, a load device, and means for connecting said load device in circuit with said secondary winding, and a direct current exciter connected in the circuit of said secondary winding at a point which is neutral when said load device is connected in circuit.

8. In combination, a dynamo-electric machine adapted for operation as both an alternating current induction motor and synchronous motor, said machine having its secondary or exciting element provided with a distributed winding of the polyphase type, a polyphase variable resistance device, means for connecting said resistance device in the circuit of said phase windings during operation of said motor as an induction motor, said secondary winding having terminals of two of said phase windings connected at a point which is neutral with respect to voltage induced in said winding sections during operation of said machine as an induction motor with said resistance in circuit, and a direct current exciter connected between a corresponding terminal of a third phase winding and said neutral point.

9. The method of starting a synchronous alternating current motor having its direct current winding of the distributed type including a plurality of winding sections each of which has one terminal connected at a point which is neutral with respect to alternating current voltage induced in said winding sections during the starting operation, which comprises initially applying alternating current energy to the alternating current winding of said motor while a source of direct current excitation is included in circuit between said neutral connection point and the adjacent terminal of one of said winding sections and the circuit of said winding sections is closed through a resistance connected to the other terminals of said winding sections, and reducing the value of said resistance as the speed of said motor approaches synchronous speed.

10. In combination, an alternating current dynamo-electric machine adapted for operation as both an induction motor and synchronous motor, said machine having its secondary or exciting element provided with a polyphase exciting winding having phase windings with terminals thereof connected at a point which is neutral with respect to voltage induced in said winding sections during operation of said machine as an induction motor, a direct current exciter permanently connected in normal series circuit with and between terminals of a plurality of said phase windings at said neutral point, a resistance device, and means for connecting said resistance device to the terminals of a plurality of said phase windings opposite from those connected at said neutral point.

In testimony whereof, the signature of the inventor is affixed hereto.

ROBERT B. WILLIAMSON.